US 11,148,099 B2

(12) United States Patent
Prince et al.

(10) Patent No.: US 11,148,099 B2
(45) Date of Patent: Oct. 19, 2021

(54) GRAPHENE-BASED MEMBRANE AND METHOD OF PRODUCING THE SAME

(71) Applicant: Ngee Ann Polytechnic, Singapore (SG)

(72) Inventors: James Antony Prince, Singapore (SG); Sowrirajalu Bhuvana, Singapore (SG); Anbharasi Vanangamudi, Singapore (SG); Gurdev Singh, Singapore (SG)

(73) Assignee: Ngee Ann Polytechnic, Singapore (SG)

( * ) Notice: Subject to any disclaimer, the term of this patent is extended or adjusted under 35 U.S.C. 154(b) by 109 days.

(21) Appl. No.: 16/743,055

(22) Filed: Jan. 15, 2020

(65) Prior Publication Data

US 2020/0164318 A1    May 28, 2020

Related U.S. Application Data

(62) Division of application No. 15/567,956, filed as application No. PCT/SG2015/050076 on Apr. 20, 2015, now Pat. No. 10,569,229.

(51) Int. Cl.

| | |
|---|---|
| *B01D 67/00* | (2006.01) |
| *B01D 71/02* | (2006.01) |
| *B01D 71/42* | (2006.01) |
| *B01D 71/76* | (2006.01) |
| *B01D 71/78* | (2006.01) |
| *B01D 71/68* | (2006.01) |
| *B01D 69/14* | (2006.01) |
| *B01D 71/60* | (2006.01) |
| *C08G 73/10* | (2006.01) |
| *C08G 73/14* | (2006.01) |
| *C08L 73/02* | (2006.01) |
| *C08L 33/24* | (2006.01) |
| *B01D 71/40* | (2006.01) |
| *C08F 220/44* | (2006.01) |
| *C08F 8/32* | (2006.01) |
| *C08F 222/06* | (2006.01) |
| *C08F 8/48* | (2006.01) |
| *C08F 8/12* | (2006.01) |

(52) U.S. Cl.
CPC ......... *B01D 67/0079* (2013.01); *B01D 67/00* (2013.01); *B01D 69/148* (2013.01); *B01D 71/021* (2013.01); *B01D 71/40* (2013.01); *B01D 71/42* (2013.01); *B01D 71/60* (2013.01); *B01D 71/68* (2013.01); *B01D 71/76* (2013.01); *B01D 71/78* (2013.01); *C08F 8/12* (2013.01); *C08F 8/32* (2013.01); *C08F 8/48* (2013.01); *C08F 220/44* (2013.01); *C08F 222/06* (2013.01); *C08G 73/101* (2013.01); *C08G 73/1075* (2013.01); *C08G 73/14* (2013.01); *C08L 33/24* (2013.01); *C08L 73/02* (2013.01); *B01D 2323/38* (2013.01); *B01D 2325/36* (2013.01); *C08F 2800/10* (2013.01); *C08F 2810/20* (2013.01)

(58) Field of Classification Search
CPC ........ B01D 71/76; B01D 71/78; B01D 71/82; B01D 2323/38; B01D 71/40; B01D 71/42; B01D 71/60; B01D 71/68
See application file for complete search history.

(56) References Cited

U.S. PATENT DOCUMENTS

| | | |
|---|---|---|
| 2011/0000367 A1 | 1/2011 | Kanougi et al. |
| 2014/0121350 A1 | 5/2014 | You et al. |
| 2014/0272286 A1 | 9/2014 | Stoltenberg et al. |
| 2015/0053607 A1 | 2/2015 | Liu et al. |

FOREIGN PATENT DOCUMENTS

| | | |
|---|---|---|
| EP | 2511002 B1 | 5/2014 |
| WO | 2011066332 A2 | 6/2011 |

OTHER PUBLICATIONS

Yoon, J. H et al., "Preparation and Characterization of Polypropylene/ Functionalized Graphene Nanocomposites", 18. sup.th International Conference on Composite Materials, Published online Feb. 20, 2014 as per Wayback Machine, pp. 1-5 [Cited in related U.S. Appl. No. 15/567,956].

Elhamnia, M et al., "The effect of graphene chain grafting on the mechanical properties of polymer/graphene nanocomposites", Scientific Cooperations International Workshops on Engineering Branches, Aug. 8-9, 2014, Koc University, Turkey, pp. 219-222 URL: http://engscoop.org/papers2014/IWCPE/7.HashemiMotlach.pdf [Cited in related U.S. Appl. No. 15/567,956].

Yuan, B et al., "Preparation of Functionalized Graphene Oxide/ Polypropylene Nanocomposite with Significantly Improved Thermal Stability and Studies on the Crystalization Behavior and Mechanical Properties", Chemical Engineering Journal, 2014, vol. 237, pp. 411-420 [Cited in related U.S. Appl. No. 15/567,956].

Lin, Y et al., "Preparation and Characterisation of Covalent Polymer Functionalized Graphene Oxide", J. Mater. Chem., 2011, vol. 21, pp. 3455-3461 [Cited in related U.S. Appl. No. 15/567,956].

Song, N et al., "Effect of Covalent-Functionalized Graphene Oxide with Polymer and Reactive Compatibilization on Thermal Properties of Maleic Anhydride Grafted Polypropylene", Ind. Eng. Chem. Res. 2014, vol. 53, p. 19951-19960 [Cited in related U.S. Appl. No. 15/567,956].

*Primary Examiner* — Jeffrey C Mullis
(74) *Attorney, Agent, or Firm* — BakerHostetler

(57) ABSTRACT

A graphene-based membrane and a method of producing the same are disclosed. The graphene-based membrane may include a graphene-polymer composite, wherein the graphene-polymer composite may consist of an amine functionalized graphene and a polymer containing an anhydride group as a linker for linking the amine functionalized graphene to the polymer. The graphene-based membrane may be constructed of a single-layer. A method may include reacting a polymer containing an anhydride with an amine functionalized graphene in presence of a solvent to form an intermediate product; and thermal imidizing the intermediate product to form a graphene grafted polymer composite for use in fabricating a graphene-based membrane.

22 Claims, 13 Drawing Sheets

GRAPHENE-BASED MEMBRANE AND METHOD OF PRODUCING THE SAME

CROSS REFERENCED APPLICATIONS

This application is divisional of U.S. patent application Ser. No. 15/567,956 filed Oct. 19, 2017, which is a 371 national stage application of PCT Application No. PCT/SG2015/050076 filed Apr. 20, 2015, incorporated herein by reference in their entireties.

FIELD OF THE INVENTION

This invention relates to a graphene-based membrane and a method of producing the same. More particularly, this invention relates to a single-layer graphene-based membrane comprising a graphene-polymer composite and a method of producing the same.

BACKGROUND

One of the most pervasive problems afflicting mankind throughout the world is poor access to clean freshwater and sanitation. With the growing demand for high quality water, many new technologies of water purification are being developed to cater for potable and non-potable use. The reliability and ease of operation of membrane-based filtration systems have led to their proliferation in wastewater treatment. Ultrafiltration (UF) is one such well-developed, low pressure membrane separation process that has been used in different applications, such as water/wastewater treatment, reverse osmosis pre-treatment and separations in the food, dairy, paper, textile, pharmaceuticals, chemical and biochemical industries. However, membrane fouling remains an unavoidable problem in all pressure driven membrane processes, causing deterioration of the membrane performance. These problems generally originate from the accumulation of organics in the effluent water, which serves as a support for the attachment and growth of microorganisms onto the membrane surface. The resulting effects of membrane fouling such as flux reduction, rejection impairment and membrane breakage lead to high operational costs and short replacement intervals.

There are several cleaning methods—such as physical (backwash) and chemical (chemical cleaning) methods available to regenerate the membrane. However, such methods often require high energy consumption and more chemical usage. These methods are ineffective while cleaning biofouling because extra cellular polymeric substances are chemically bound to the membrane surface and hence, it is the most difficult type of fouling to clean. Preventing biofouling on the membrane surface is always better than cleaning the membrane that has been fouled. Membrane materials are more sensitive to fouling and hence, development of new membrane materials or modification of the current membrane materials/membrane surface has constantly been explored to address the problem of fouling.

Polymeric materials based membranes are most widely used for water treatment. This is due to their increased in separation efficiency and decreased maintenance costs when compared to inorganic materials based membranes. Long term liquid based pressure driven separation processes such as ultrafiltration (UF) and microfiltration (MF) requires polymeric membrane materials that possess properties such as good mechanical strength, thermal stability and excellent chemical resistance to have a reduced maintenance cost. Polymeric materials that are commonly used include polysulfone (PS), cellulose acetate (CA), polyvinyl alcohol (PVA), polyvinyl chloride (PVC), polyvinylidene fluoride (PVDF), cellulose nitrate (CN), polyethersulphone (PES), poly acrylonitrile (PAN), etc. In recent years, metal organic framework based (MOF) membranes, block copolymers based membranes, carbon nanomaterials based membrane and aquaporin based bio-mimetic membranes are getting much attention in the field of desalination and water treatment.

In recent years, graphene also gained much attention in the field of membrane science and engineering due to its high surface area, mechanical strength and chemical stability. Theoretical analysis has also predicted that graphene-based membranes may exhibit 2-3 orders of magnitude higher permeability than the current state of the art membranes. However, experimental studies show that there are limitations in achieving such improved permeability due to the challenges associated with the fabrication of leak-free porous graphene membranes with very large surface area.

In recent years, carbon nanotubes and graphene have been viewed as new types of nanofillers to improve the selectivity and the separation performance of polymeric ultrafiltration (UF) membranes due to the interaction of contaminants with the delocalized p-electrons of the nanocarbons. It is also reported that the nanocarbon based fillers enhance the thermal stability and mechanical strength of the polymeric membranes. However, it is commonly accepted that supported graphene is hydrophobic in nature and its water contact angle is, to some extent, higher than that of graphite. Moreover, these fillers are normally associated with relatively poor dispersion within the polymer matrix, a problem which limits the antifouling property of the membrane.

Attempts have been made to produce graphene-based membranes.

US 2015/0053607 A1 discloses a graphene derivative composite membrane and a method for fabricating the same. The graphene derivative composite membrane comprises a supporting membrane made of porous polymer and a plurality of graphene derivative layers disposed on the support membrane. The graphene derivative and the polymer form different layers of the membrane.

US 2012/0255899 A1 discloses a graphene-containing separation membrane. The separation membrane includes a polymer support and graphene on at least one surface of the polymer support. The graphene may be in direct contact with the polymer support or an intermediate layer may be provided between the polymer support and the graphene. The graphene and the polymer form different layers of the membrane.

Membrane that is made of different layer may involve highly complex membrane fabrication process, which requires many steps, and the possibility of membrane failure owing to delamination of the separation layer, which occurs during sintering or variations in filtration pressures. Such membrane is usually used only in specific applications based on the properties of the materials used in forming the different layers.

Graphene oxide is an amphiphilic graphene derivative (a single-atom layer of graphene) with oxygen containing functional groups (—OH, —COOH) attached to both sides of the graphene flake. With the addition of the oxygen groups, the double bonds holding the carbon atoms together can break more easily, resulting in the loss of the material's electrical conductivity. However, there are important beneficial aspects to having these oxygen containing functional groups attached to the graphene structure. Firstly, they impart polarity to the flake so that the graphene oxide is able to be more uniformly dispersed in solvents and eventually in the polymer matrix it is blended into. Further, these oxygen containing hydrophilic functional groups improve the wetting properties (hydrophilic properties) of the normally hydrophobic polymeric membranes through hydrogen bonding. Indeed, literature reports that the contact angle of water on pristine graphene oxide films can vary from 0 (by theory) to 60 (by experiment) degrees.

Even though graphene and its derivatives have been shown to exhibit the potential for better performance, the use of these material based membranes in real applications is still a dream due to their hydrophobicity and limitations in the fabrication process.

It is therefore desirable to provide a membrane and a method of producing the same that seek to address at least one of the problems described hereinabove, or at least to provide an alternative.

SUMMARY OF INVENTION

In accordance with a first aspect of this invention, a single-layer graphene-based membrane comprising a graphene-polymer composite is provided. The graphene-polymer composite in accordance with this invention consists of an amine functionalized graphene and a polymer containing an anhydride group as a linker for linking the amine functionalized graphene to the polymer.

In accordance with a second aspect of this invention, a composition for fabricating a single-layer graphene-based membrane is provided. The composition comprises a graphene-polymer composite, wherein the graphene-polymer composite consists of an amine functionalized graphene and a polymer containing an anhydride group as a linker for linking the amine functionalized graphene to the polymer.

In accordance with an embodiment of this invention, the graphene-polymer composite is a graphene grafted poly(acrylonitrile-co-maleimide).

In accordance with an embodiment of this invention, the graphene-polymer composite further comprises a second polymer selected from the group consisting of polyethersulfone, polyvinylidene fluoride, polyacrylonitrile, cellulose acetate, polytetrafluoroethylene and polypropylene.

In accordance with an embodiment of this invention, wherein the second polymer is polyethersulfone.

In accordance with a third aspect of this invention, a method of producing a single-layer graphene-based membrane from a graphene-polymer composite is provided. The method comprises the steps of (i) reacting a polymer containing an anhydride group with an amine functionalized graphene in presence of a solvent to form an intermediate product; and (ii) thermal imidizing the intermediate product to form a graphene grafted polymer composite for use in fabricating graphene-based membrane.

In accordance with an embodiment of this invention, the polymer containing the anhydride group is poly(acrylonitrile-co-maleic anhydride). The graphene grafted polymer is graphene grafted poly(acrylonitrile-co-maleimide).

In accordance with an embodiment of this invention, the thermal imidization is carried out at heating the intermediate product at a temperature ranging from 115° C. to 255° C. for a period of 1.5 to 4.5 hours.

In accordance with an embodiment of this invention, the thermal imidization is carried out by heating the intermediate product at 195° C. to 125° C. for 0.5 to 1.5 hours, followed by 180° C. to 220° C. for another 0.5 to 1.5 hours, and at 245° C. to 255° C. for yet another 0.5 to 1.5 hours.

In accordance with an embodiment of this invention, the method further comprises adding the graphene grafted polymer composite to a solution containing polyvinylpyrolidone, N-methyl-2-pyrolidone and diethylene glycol. The solution is stirred to obtain a homogenous polymeric casting solution for use in fabricating graphene-based membrane.

In accordance with an embodiment of this invention, the casting solution comprises 15 to 40 wt % graphene grafted polymer composite, 2 to 15 wt % polyvinylpyrolidone, 1 to 15 wt % diethylene glycol and 40 to 80 wt % N-methyl-2-pyrolidone.

In accordance with an embodiment of this invention, the method further comprises adding a second polymer selected from the group consisting of polyethersulfone, polyvinylidene fluoride, polyacrylonitrile, cellulose acetate, polytetrafluoroethylene and polypropylene to the graphene grafted poly(acrylonitrile-co-maleimide) composite to form a mixture. The mixture is then added to a solution containing polyvinylpyrolidone, N-methyl-2-pyrolidone and diethylene glycol. The solution is stirred to obtain a homogenous polymeric casting solution for use in fabricating graphene-based membrane.

In accordance with an embodiment of this invention, wherein the second polymer is polyethersulfone.

In accordance with an embodiment of this invention, the casting solution containing the modified polyethersulfone graphene grafted poly(acrylonitrile-co-maleimide) composite comprises 15 to 40 wt % polyethersulfone, 2 to 15 wt % polyvinylpyrolidone, 1 to 15 wt % diethylene glycol, 40 to 80 wt % N-methyl-2-pyrolidone and 1 to 25 wt % graphene grafted poly(acrylonitrile-co-maleimide) composite.

In accordance with an embodiment of this invention, the graphene-based membrane is a flat sheet membrane. In another embodiment of this invention, the graphene-based membrane is a hollow-fiber membrane.

BRIEF DESCRIPTION OF THE DRAWINGS

The above advantages and features of a method and apparatus in accordance with this invention are described in the following detailed description and are shown in the drawings:

FIG. 4(*b*) is a Raman spectroscopy analysis of an unmodified graphene, amine functionalized graphene and graphene grafted poly(acrylonitrile-co-maleimide).

FIG. 4(*c*) illustrates zeta potential results of poly(acrylonitrile-co-maleic anhydride) (PANCMA) and graphene grafted poly(acrylonitrile-co-maleimide) (G-PANCMI).

DETAILED DESCRIPTION

Figure 1:
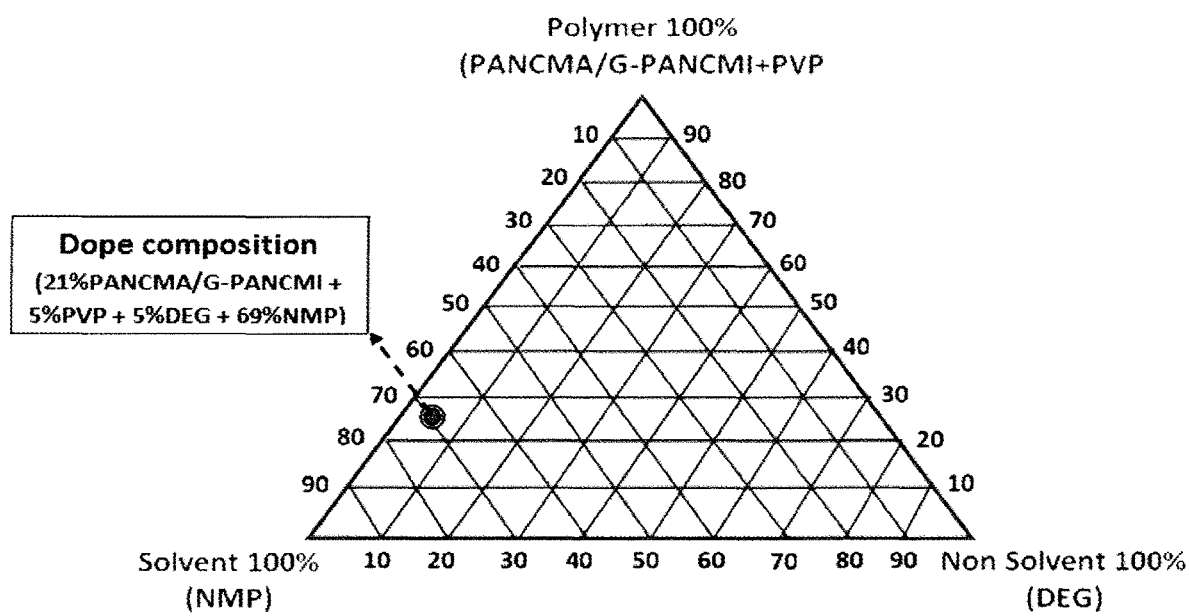
FIG. 1 is a phase diagram showing the dope composition for fabricating the graphene grafted poly(acrylonitrile-co-maleimide) (G-PANCMI) membrane in accordance with an embodiment of the present invention.

Various embodiments of the invention relate to a graphene-based membrane and a method of producing the same. More particularly, various embodiments of this invention relate to a single-layer graphene-based membrane comprising a graphene-polymer composite and a method of producing the same.

In accordance with an embodiment of the present invention, the single-layer graphene-based membrane comprises a graphene-polymer composite, wherein the graphene-polymer composite consists of an amine functionalized graphene and a polymer containing an anhydride group as a linker for linking the amine functionalized graphene to the polymer. Any polymer containing an anhydride group can be used as a linker in accordance with some embodiments of the present invention. In one embodiment, the graphene-polymer composite is a graphene grafted poly(acrylonitrile-co-maleimide). The method for the preparation of the composite will be described in further detail hereinafter.

"Graphene" as used herein refers to, for example, exfoliated graphene nanoplatelets, pristine graphene, graphene nanosheets, functionalized graphene, chemically converted graphene, and combinations thereof. The graphene may also include any nanocarbon materials such as single-walled carbon nanotubes, multi-walled carbon nanotubes, and graphite that requires further processing to obtain single-layer graphene.

The term "graphene-based membrane" as used herein refers to, for example, membrane that is fabricated from graphene, such as exfoliated graphene nanoplatelets, pristine graphene, functionalized graphene, chemically converted graphene, graphene nanosheets, and combinations thereof.

The term "grafted" as used herein refers to the presence of a covalent bond between graphene and the polymer. The graphene is covalently attached to the polymer to form a graphene-polymer composite. In one embodiment, the graphene is covalently attached to poly(acrylonitrile-co-maleimide) to form graphene grafted poly(acrylonitrile-co-maleimide).

The term "functionalized graphene" as used herein refers to, for example, graphene functionalized with at least one of carboxyl groups, amines, hydroxyl groups and combination thereof. The term "amine functionalized graphene" as used herein refers to graphene functionalized with at least an amine group, with or without the other functional groups.

The graphene-polymer composite in accordance with some embodiments of the present invention comprises 30-70% graphene and 30-70% polymer. In one embodiment, the graphene-polymer composite comprises graphene in an amount higher than the amount of polymer present in the composite.

In accordance with another embodiment of the present invention, the single-layer graphene-based membrane comprises a graphene-polymer composite consisting of graphene grafted poly(acrylonitrile-co-maleimide) and a second polymer including, but not limited to, polyethersulfone, polyvinylidene fluoride (PVDF), polyacrylonitrile (PAN), cellulose acetate, polytetrafluoroethylene (PTFE) and polypropylene (PP). In a preferred embodiment, the second polymer is polyethersulfone. An exemplary method for the preparation of this composite will be described in further detail hereinafter.

The average pore size of the graphene-based membrane varies depending on its applications, and is typically in the range of 0.04 to 0.10 µm. In an exemplary embodiment, the graphene grafted poly(acrylonitrile-co-maleimide) membrane has an average pore size of 0.05 to 0.09 µm. In another exemplary embodiment, the modified polyethersulfone graphene grafted poly(acrylonitrile-co-maleimide) membrane has an average pore size of 0.04 to 0.10 µm.

The thickness of the graphene-based membrane varies depending on its applications, and is typically in the range of 50 µm-250 µm.

The graphene-based membrane in accordance with some embodiments of the present invention is constructed of a single-layer using the graphene-polymer composite of some embodiments of the present invention. In one embodiment, the single-layer is formed from using the graphene grafted poly(acrylonitrile-co-maleimide) composite, In another embodiment, the single-layer is formed from using the modified polyethersulfone graphene grafted poly(acrylonitrile-co-maleimide) composite or a graphene-polymer composite consisting of graphene grafted poly(acrylonitrile-co-maleimide) and a second polymer including, but not limited to polyvinylidene fluoride (PVDF), polyacrylonitrile (PAN), cellulose acetate, polytetrafluoroethylene (PTFE) and polypropylene (PP).

The graphene-based membrane of some embodiments of the present invention may be of any suitable membrane type, such as hollow-fiber, flat sheet, capillary or tubular membranes. In one embodiment of the invention, the graphene-based membrane is a flat sheet membrane. In another embodiment, the graphene-based membrane is a hollow-fiber membrane.

In accordance with a second aspect of the invention, a composition for preparing a graphene-membrane is provided. The composition comprises a graphene-polymer composite, wherein the graphene-polymer composite consists of an amine functionalized graphene and a polymer containing an anhydride group as a linker for linking the amine functionalized graphene to the polymer. Any polymer containing an anhydride group can be used as a linker in accordance with the composition of some embodiments of the present invention. In one embodiment, the graphene-polymer composite is graphene grafted poly(acrylonitrile-co-maleimide).

In accordance with another embodiment of the invention, the composition comprises a graphene-polymer composite, wherein the graphene-polymer composite is modified polyethersulfone graphene grafted poly(acrylonitrile-co-maleimide). In accordance with other embodiments of the invention, the composition comprises a graphene-polymer composite, wherein the graphene-polymer composite consists of a graphene grafted poly(acrylonitrile-co-maleimide) and a second polymer including, but not limited to, polyvinylidene fluoride (PVDF), polyacrylonitrile (PAN), cellulose acetate, polytetrafluoroethylene (PTFE) and polypropylene (PP).

Some embodiments of this invention relate to a method of producing a single-layer graphene-based membrane from a graphene-polymer composite. The method comprising the steps of reacting a polymer containing an anhydride group with an amine functionalized graphene in presence of a solvent to form an intermediate product; and subjecting the intermediate product to thermal imidization to form a graphene grafted polymer composite for use in fabricating a graphene-based membrane.

Any polymer containing an anhydride group can be used as a linker in accordance with the method of some embodiments of the present invention. In one embodiment, the polymer containing the anhydride group is poly(acrylonitrile-co-maleic anhydride), and the graphene grated polymer composite is graphene grafted poly(acrylonitrile-co-maleimide).

The functionalized graphene or amine functionalized graphene can be prepared using any method known in the art. An exemplary method is described in Example 1 below.

The solvent for use in the method of many embodiments of the present invention is a polar aprotic solvent. Any appropriate polar aprotic solvent can be used. Examples include, but not limited to, N—N-dimethyl acetamide, N-methyl 2-pyrrolidone (NMP), N—N-dimethyl formamide (DMF) and derivatives thereof.

In one embodiment, the polymer containing the anhydride group reacts with the amine functionalized graphene at a temperature ranging from 70° C. to 90° C., preferably at 80° C. The reactants are allowed to react for about 19 to 29 hours, preferably about 24 hours before the reaction mixture is filtered, washed and dried to remove the solvent. This reaction leads to the formation of an intermediate product in amic acid form. In the embodiment in which poly(acrylonitrile-co-maleic anhydride) is used, the intermediate product formed at this stage is graphene grafted poly(acrylonitrile-co-maleic acid).

The term "thermal imidization" as used herein refers to a step of converting polyamic acid to polyimide by using heat, preferably multi-stage heating.

In accordance with some embodiments of the present invention, the intermediate product is subjected to thermal imidization to form graphene grafted polymer composite for use in fabricating the graphene-based membrane. The thermal imidization is carried out by heating the intermediate product in stages to elevated temperatures to convert the amic acid functional groups in the intermediate product to graphene grafted polymer. In one embodiment, the thermal imidization is carried out at a temperature ranging from 115° C. to 255° C. for a period of 1.5 to 4.5 hours. In one embodiment, the thermal imidization is carried out by heating the intermediate product at a temperature ranging from 195° C. to 125° C. for 0.5 to 1.5 hours, followed by 180° C. to 220° C. for another 0.5 to 1.5 hours, and at 245° C. to 255° C. for yet another 0.5 to 1.5 hours. In a preferred embodiment, the thermal imidization is carried out by heating the intermediate product at 120° C. for 2 hours, followed by 200° C. for 1 hour.

Figure 3:
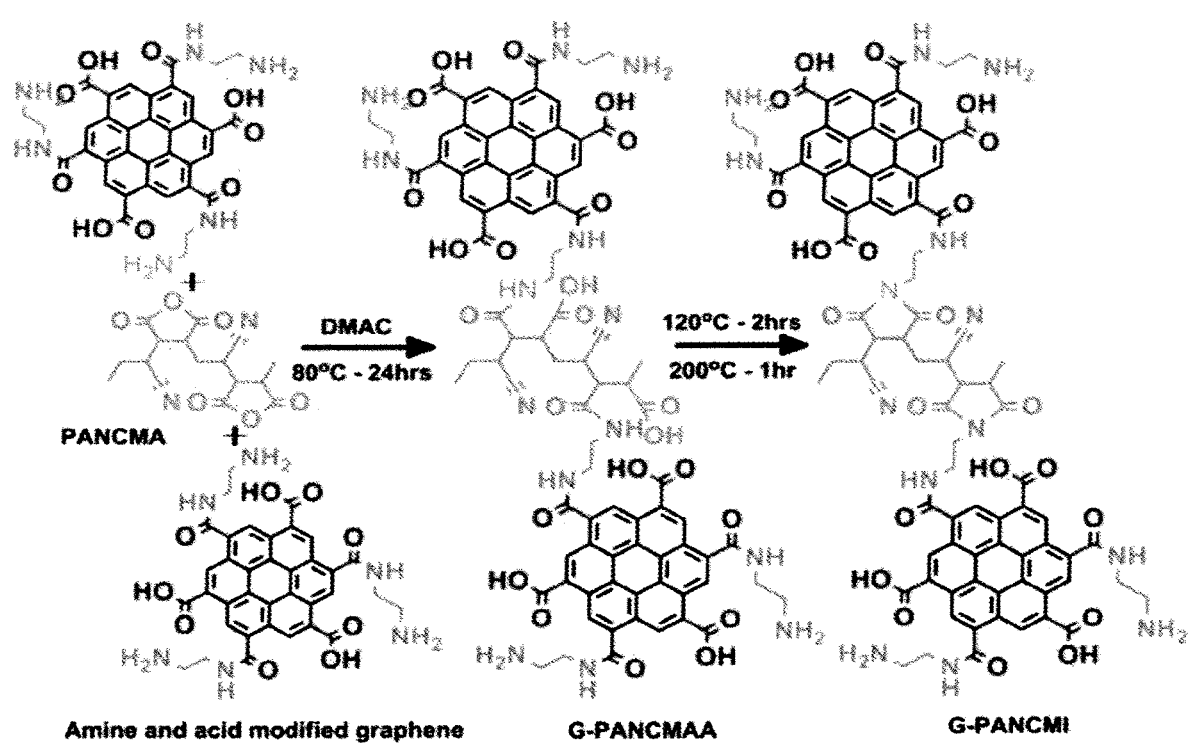
FIG. 3 illustrates a schematic representation of an exemplary chemical synthesis protocol for preparing the graphene grafted poly(acrylonitrile-co-maleimide) in accordance with an embodiment of the present invention.

FIG. 3 outlines an exemplary chemical synthesis protocol for preparing the graphene grafted polymer composite (in particular, the graphene grafted poly(acrylonitrile-co-maleimide) composite) in accordance with an embodiment of the present invention.

The graphene grafted polymer composite obtained thereto is then used in conjunction with other compounds to form casting solution for fabricating the graphene-based membrane of some embodiments of the present invention.

The composition of the casting solution consists of 15 to 40 wt % graphene grafted polymer (or graphene grafted poly(acrylonitrile-co-maleimide), 2 to 15 wt % polyvinylpyrolidone (preferably PVP-K-30), 1 to 15 wt % diethylene glycol and 40 to 80 wt % N-methyl-2-pyrolidone. In one embodiment, the composition of the casting solution consists of 21 wt % graphene grafted poly(acrylonitrile-comaleimide), 5 wt % polyvinylpyrolidone (preferably PVP-K-30), 5 wt % diethylene glycol and 69 wt % N-methyl-2-pyrolidone.

In this embodiment, the graphene grafted polymer (or the graphene grafted poly(acrylonitrile-co-maleimide) is used as the base polymer, N-methyl-2-pyrolidone is used as the base solvent, diethylene glycol is used as a non-solvent and polyvinylpyrolidone is used as an additive (pore forming agent). The phase diagram of the casting solution (or dope composition) is shown in FIG. 1.

In one embodiment, the casting solution (or dope composition) is prepared by adding graphene grafted polymer (or graphene grafted poly(acrylonitrile-co-maleimide) to a solution containing polyvinylpyrolidone, diethylene glycol and N-methyl-2-pyrolidone. The solution is then stirred to obtain a completely dissolved/dispersed homogenous polymeric casting solution for use in fabricating the graphene-based membrane.

The casting solution (or dope composition) can be used to fabricate any suitable type of membrane. In an exemplary embodiment, the casting solution is used for fabricating flat sheet membrane. The membrane can be fabricated using any suitable method now known or hereafter developed. In an exemplary embodiment, the flat sheet membrane is fabricated using phase inversion method.

Figure 2:
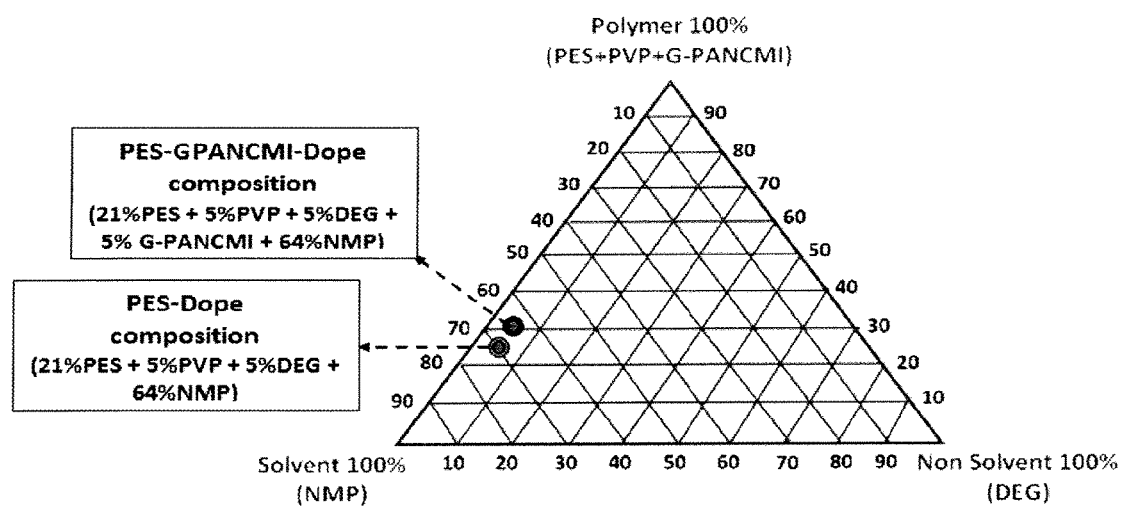
FIG. 2 is a phase diagram showing the dope composition for fabricating the modified polyethersulfone graphene grafted poly(acrylonitrile-co-maleimide) (PES-G-PANCMI) membrane in accordance with an embodiment of the present invention.

In another embodiment of the invention, the method comprises adding a second polymer, polyethersulfone to the graphene grafted polymer (or graphene grafted poly(acrylonitrile-co-maleimide) composite to form mixture. The mixture is then added to a solution comprising polyvinylpyrolidone, N-methyl-2-pyrolidone and diethylene glycol. The solution is stirred to obtain a homogenous polymeric casting solution containing modified polyethersulfone graphene grafted polymer (or modified polyethersulfone graphene grafted poly(acrylonitrile-co-maleimide) composite for use in fabricating the graphene-based membrane. In one embodiment, the composition of the casting solution consists of 15 to 40 wt % polyethersulfone, 2 to 15 wt % polyvinylpyrolidone, 1 to 15 wt % diethylene glycol, 40 to 80 wt % N-methyl-2-pyrolidone and 1 to 25 wt % graphene grafted polymer (or graphene grafted poly(acrylonitrile-co-maleimide). In another embodiment, the casting solution consists of 21 wt % polyethersulfone, 5 wt % polyvinylpyrolidone, 5 wt % diethylene glycol, 64 wt % N-methyl-2-pyrolidone and 5 wt % graphene grafted poly(acrylonitrile-co-maleimide). In this embodiment, the polyethersulfone is used as the base polymer, N-methyl-2-pyrolidone is used as the base solvent, diethylene glycol is used as a non-solvent, polyvinylpyrolidone is used as an additive (pore forming agent) and the graphene grafted polymer (or graphene grafted poly(acrylonitrile-co-maleimide)) is used as a hydrophilic additive. The phase diagram of the casting solution (or dope composition) for this embodiment is shown in FIG. 2. Other polymer including, but not limited to, polyvinylidene fluoride (PVDF), polyacrylonitrile (PAN), cellulose acetate, polytetrafluoroethylene (PTFE) and polypropylene (PP) can also be used as the second polymer without departing from the scope of various embodiments of the invention.

The casting solution (or dope composition) containing the modified polyethersulfone graphene grafted polymer (or modified polyethersulfone graphene grafted poly(acrylonitrile-co-maleimide)) can be used to fabricate any suitable type of membrane. In an exemplary embodiment, the casting solution is used for fabricating a hollow-fiber membrane. Any suitable type of method for fabricating the membrane can be used. In an exemplary embodiment, the hollow-fiber membrane is fabricated using dry-wet spinning method.

The method in accordance with some embodiments of the present invention is suitable for fabricating ultrafiltration (UF) membrane, although one skilled in the art will appreciate that other types of membranes, such as microfiltration (MF), nanofiltration (NF) and reverse osmosis (RO) membranes can also be fabricated using the method of many embodiments of the present invention without departing from the scope of the invention. In one embodiment, the graphene-based membrane produced by the method of the present invention has an average pore size of 0.04 to 0.10 μm.

Some embodiments in accordance with the present invention has several advantages over conventional membrane technology. One of the advantages includes increased wettability of the membrane. This is made possible by the presence of the functionalized graphene in the graphene-polymer composite used in fabricating the membrane. In some embodiments of the present invention, the wettability of the graphene has been increased by amination and carboxylation to an ultra-wetting level where the water contact angle is zero. This functionalized graphene causes the graphene-based membrane of some embodiments of the present invention to have an ultra-wetting property. The graphene-based membrane of many embodiments of the present invention gives 2-3 times better performance in terms of its wettability and dispersibility as compared to conventional membrane which does not contain any graphene.

The ultra-wetting graphene-based membrane of some embodiments of the present invention can also prevent or reduce the fouling effects of the membrane. The term "fouling" as used herein refers to the depositing, building up or adhering of various substances on the membrane and/or the physical or chemical degradation of the membrane. This property of the graphene-based membrane is made possible by the functional groups (such as amine, hydroxyl and carboxylic groups) that are attached to the graphene. Other advantages of the graphene-based membrane of some embodiments of the present invention include increased pure water flux and increased membrane stability.

The method of some embodiments of the present invention is cost effective and the method provides an efficient way of producing an ultra-wetting membrane. Other advantages in accordance with some embodiments of the present invention include increased simplicity of operation.

It will be understood that the properties of the graphene-based membrane described hereinabove are not meant to be limiting in any regard and are provided simply as examples. The graphene-based membranes of some embodiments of the present invention may be used in variety of applications. One example is a wastewater treatment system in which membranes are commonly used to purify wastewater. The membrane may be implemented in various scenarios depending upon the conditions of the water to be treated, and the system and environment in which the membrane is implemented.

The following examples illustrate various embodiments of this invention. One skilled in the art will recognize that the examples set out below are not an exhaustive list of the embodiments of this invention.

EXAMPLE

The materials used in the following examples include the following:

Acrylonitrile, maleic anhydride, ethylene diamine, and azobisisobutyronitrile (AIBN) were purchased from Sigma Aldrich with 99% purity. High purity ethanol, nitric acid (HNO$_3$), sulphuric acid (H$_2$SO$_4$), thionyl chloride (SOCl$_2$), N—N-Dimethyl acetamide (DMAc) and fluorescein isothiocyanate (FITC) attached bovine serum albumin (BSA) were also purchased from Sigma Aldrich and used as received. The graphene exfoliated graphene nanoplatelets were purchased from XG Sciences. The waste water used for long time filtration was collected from a local reservoir with a total organic content (TOC) of 81.59 ppm and a turbidity of 138 NTU. The water used for the reaction was distilled and de-ionized (DI) with a Milli-Q plus system from Millipore, Bedford, Mass., USA.

Example 1

Synthesis of Functionalized Graphene

About 1 g of pristine graphene was pre-treated with an excess of acid mixture (comprising sulphuric acid/nitric acid in a ratio of 3:1) to introduce the acid functionality onto the graphene surfaces. This step was carried out at a temperature of about 55° C. to 85° C. for 19 to 29 hours. After successful oxidation, the functionalized graphene was centrifuged, filtered and washed with excess water until the pH of the wash water was neutral. The acid functionalized graphene was thoroughly dried and further refluxed with 150 ml thionyl chloride at a temperature ranging from 60° C. to 80° C. for about 19 to 29 hrs. Excess thionyl chloride was then filtered off before 150 ml of ethylene diamine was added to the reaction vessel, operating under reflux at a temperature ranging from 60° C. to 80° C. for another 19 to 29 hrs to obtain an amine functionalized graphene. The amine functionalized graphene was then separated out by centrifugation and washed with excess ethanol to remove any unreacted reagents.

Example 2

Synthesis of Graphene Grafted Poly(Acrylonitrile-Co-Maleimide) (G-PANCMI)

Poly(acrylonitrile-co-maleic anhydride) (PANCMA) was prepared by having both acrylonitrile and maleic anhydride (1:1 molar ratio) dissolved in N—N Dimethyl acetamide in presence of azobisisobutyronitrile as an initiator. The solution was stirred at room temperature for about 24 hours to obtain a poly(acrylonitrile-co-maleic anhydride) in solvent. The mixture was then filtered and washed with ethanol, and dried at 60° C. to 80° C. for 7 to 17 hours to obtain the poly(acrylonitrile-co-maleic anhydride) (PANCMA).

The synthesized poly(acrylonitrile-co-maleic anhydride) (PANCMA) was allowed to react for about 24 hrs with the amine functionalized graphene (obtained in Example 1) in 500 ml of N—N-dimethyl acetamide (DMAc) at 80° C. This reaction leads to the formation of a graphene grafted poly (acrylonitrile-co-maleic acid (G-PANCMA) in amic acid form. This intermediate product was further subjected to thermal imidization using multi-stage heating. The intermediate product was first heated at 120° C. for 2 hrs, followed by 200° C. for 1 hr to obtain the final graphene grafted poly(acrylonitrile-co-maleimide) (G-PANCMI).

Example 3

Preparation of Flat Sheet Membrane

Graphene grafted poly(acrylonitrile-co-maleimide) (G-PANCMI) membrane was prepared using simple phase inversion method. In this example, the graphene grafted poly(acrylonitrile-co-maleimide) (G-PANCMI) was used as the base polymer, N-methyl-2-pyrolidone (NMP) was used as a base solvent, diethylene glycol (DEG) was used as a non-solvent and polyvinylpyrolidone (PVP) was used as an additive (pore forming agent), to form a casting solution. The casting solution in this example consists of 21 wt % G-PANCMI, 5 wt % polyvinylpyrolidone (PVP-K-30), 5 wt % diethylene glycol (DEG), and 69 wt % N-methyl-2-pyrolidone (NMP). The phase diagram of the dope composition obtained in this example is as shown in FIG. 1.

The casting solution was prepared by first adding PVP powder into the NMP/DEG mixture in a round bottom flask. The solution was stirred by a mechanical stirrer for at least 1.0 to 1.5 hrs.

After the PVP was completely dissolved in the solution, the graphene grafted poly(acrylonitrile-co-maleimide) (G-PANCMI) was added to the solution. The mixture was stirred at a constant speed of 250~350 rpm for at least 24 hrs at 80° C. to obtain a completely dissolved/dispersed homogeneous polymeric solution. The homogeneous polymeric solution containing the graphene grafted poly(acrylonitrile-co-maleimide) was used to fabricate ultrafiltration membrane using phase inversion method The polymeric solution (or dope solution) was casted at room temperature by immersion precipitation (phase inversion) process. The dope solution was casted onto a glass plate at around 25° C. and at around 60% relative humidity by means of a casting rod with a gap of 100 microns. The glass plate with the casted film of polymer was then immersed into water (non-solvent) for coagulation. The membrane was then left inside a water tray for 24 hrs to washout the residual solvent (DMAC) that was not removed from the solution at the point of coagulation. The prepared membrane was then immersed into a post-treatment solution of 60% water and 40% glycerin before the clean water flux of the membrane was tested.

For comparison, a poly(acrylonitrile-co-maleic anhydride) (PANCMA) membrane was prepared according to the method sets forth above.

Example 4

FTIR Analysis of Graphene, Poly(Acrylonitrile-Co-Maleic Acid) (PANCMA) and Graphene Grafted Poly(Acrylonitrile-Co-Maleimide) (G-PANCMI)

The structures of the amine modified graphene, poly (acrylonitrile-co-maleic anhydride) (PANCMA) and graphene grafted poly(acrylonitrile-co-maleimide) (G-PANCMI) were studied using Fourier Transform Infrared (FTIR) spectroscopy and the results obtained are as shown in FIG. 3(a).

The FTIR spectrum of the amine modified graphene shows a broad peak around 3436 cm$^{-1}$ for amine stretching vibration (—NH stretching), a small peak at 2915 cm$^{-1}$ for the —CH stretching vibrations of the ethylene moiety in ethylene diamine and a sharp and intense peak at 1672 cm$^{-1}$ for —NH bending vibration. This confirms the attachment of ethylene diamine to the graphene.

The FTIR spectrum of poly(acrylonitrile-co-maleic acid) (PANCMA) shows a small band at 2972 cm$^{-1}$ for the —CH stretching vibration of the —CH$_2$ groups in maleic anhydride, a sharp peak at 2243 cm$^{-1}$ corresponding to the —C—N stretching vibration of the nitrile group and bands at 1784 cm$^{-1}$ and 1707 cm$^{-1}$ for the —C═O stretching vibrations of the anhydride carbonyl groups.

The FTIR spectrum of graphene grafted poly(acrylonitrile-co-maleimide) (G-PANCMI) shows a broad band at 3219 cm$^{-1}$ corresponding to the —NH stretching vibration of the diamine moiety, a small peak at 2931 cm$^{-1}$ for the —CH stretching vibration, a sharp peak at 2245 cm$^{-1}$ corresponding to the —CN stretching vibration of the nitrile group and two sharp peaks at 1770 cm$^{-1}$ and 1718 cm$^{-1}$ corresponding to the —C=O stretching vibrations of the imide carbonyl groups and finally, a peak at 1386 cm$^{-1}$ for —C—N—C stretching vibration. These results confirm the formation of imide functionality by the attachment of the amine modified graphene to the poly(acrylonitrile-co-maleic anhydride) (PANCMA).

Raman Spectral Analysis of Graphene, Poly(Acrylonitrile-Co-Maleic Anhydride) (PANCMA) and Graphene Grafted Poly(Acrylonitrile-Co-Maleimide) (G-PANCMI)

FIG. 3(b) shows the Raman spectra of graphene, aminated graphene and graphene grafted poly(acrylonitrile-co-maleimide) (G-PANCMI). All three compounds exhibited both the D-band at around 1350 cm$^{-1}$ and G-band at 1590 cm$^{-1}$.

The intensity of D-band in aminated graphene is significantly larger as compared to that of graphene, which is ascribed to the disordered structure of the aminated graphene by the amine treatment.

The D-band intensity is further increased in graphene grafted poly(acrylonitrile-co-maleimide) (G-PANCMI), which indicates the attachment of poly(acrylonitrile-co-maleic anhydride) (PANCMA) to the graphene structure. The G-band, which is ascribed to the ordered structure, is also increased due to amination and poly(acrylonitrile-co-maleic anhydride) (PANCMA) attachment. The attachment of polymer to the graphene structure is further confirmed by the increase in ID/IG ratio, from 0.23 to 0.56 and to 0.60 for graphene, aminated graphene and graphene grafted poly(acrylonitrile-co-maleimide) (G-PANCMI) respectively. These results indicate that the attached molecules are in between the platelet galleries, providing a disordered structure for graphene.

Thermal Property

TGA and DSC Analysis

The differences in thermal stability of poly(acrylonitrile-co-maleic anhydride) (PANCMA) and graphene grafted poly(acrylonitrile-co-maleimide) (G-PANCMI) are highlighted in FIG. 3(d). Compared to poly(acrylonitrile-co-maleic anhydride) (PANCMA), graphene grafted poly(acrylonitrile-co-maleimide) (G-PANCMI) showed excellent thermal stability. There was a slight weight loss at about 90° C. for poly(acrylonitrile-co-maleic anhydride) (PANCMA), which may be due to loss of solvent or water molecules adsorbed onto it. The drastic weight loss for poly(acrylonitrile-co-maleic anhydride) (PANCMA) occurred at about 190° C., showing the complete degradation of poly(acrylonitrile-co-maleic anhydride) (PANCMA) at around this temperature. In sharp contrast, graphene grafted poly(acrylonitrile-co-maleimide) (G-PANCMI) showed greater thermal stability up to a temperature of 400° C. This shows that graphene grafted poly(acrylonitrile-co-maleimide) (G-PANCMI) has improved thermal resistance due to the attachment of graphene in the polymer matrix.

Surface Analysis

Zeta Potential Analysis

FIG. 3(c) shows the zeta potential analysis of poly(acrylonitrile-co-maleic anhydride) (PANCMA) and graphene grafted poly(acrylonitrile-co-maleimide) (G-PANCMI). Zeta potential is a key indicator of surface charge as well as the stability of colloidal dispersions. The increased polarity and charge density of the modified graphene were due to the presence of carboxyl, hydroxyl and amine functional groups. These functional groups increased the negative charge of the polymer. It was also observed that, at normal pH (of around 6-7), the graphene grafted poly(acrylonitrile-co-maleimide) (G-PANCMI) was more stable in dispersion than poly(acrylonitrile-co-maleic anhydride) (PANCMA) as it exhibits high negative potential of about −40 my at this pH.

Contact Angle Analysis and Dispersibility Test

Contact Angle Analysis

Figures 4A, 4B:
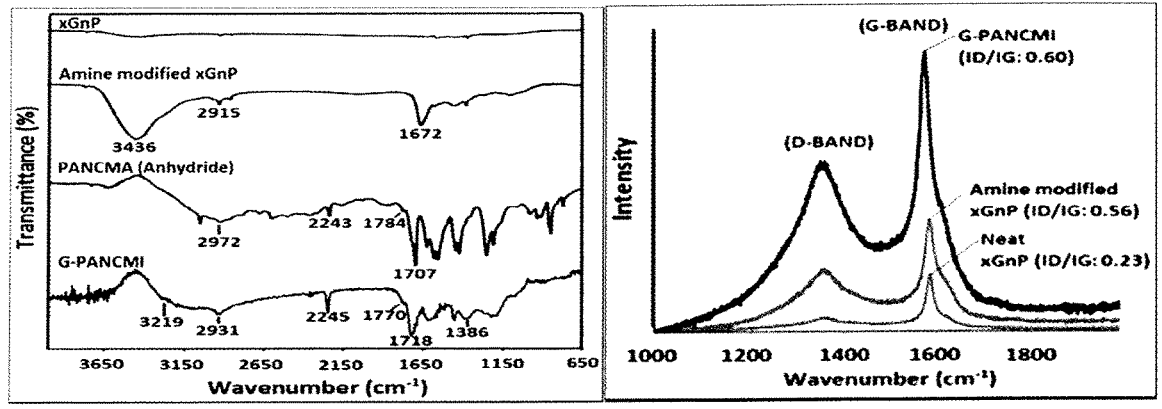
FIG. 4(*a*) is a FTIR spectrum of graphene, amine functionalized graphene, poly(acrylonitrile-co-maleic anhydride) and graphene grafted poly(acrylonitrile-co-maleimide).
FIG. 4(d) shows the TGA analysis of poly(acrylonitrile-co-maleic anhydride) (PANCMA) and graphene grafted poly(acrylonitrile-co-maleimide) (G-PANCMI) membranes.

In order to evaluate the hydrophilicity of the ultra-wetting graphene-based membrane, the prepared membranes were tested for their water contact angle. The data obtained are as shown in FIG. 4(a).

It was observed that the water contact angle of the graphene grafted poly(acrylonitrile-co-maleimide) (G-PANCMI) membrane was reduced to zero (ultra-wetting level) which is 100% lower than that of the poly(acrylonitrile-co-maleic anhydride) (PANCMA) membrane (average water contact angle of poly(acrylonitrile-co-maleic anhydride) membrane is 63.3°). The contact angle reduction for the graphene grafted poly(acrylonitrile-co-maleimide) (G-PANCMI) membrane is due to the presence of highly hydrophilic carboxyl (—COOH) and amine (—NH$_2$) functional groups on the surface of the graphene nanosheets attached to the graphene grafted poly(acrylonitrile-co-maleimide) (G-PANCMI).

The contact angle reduction by time was also evaluated for both the poly(acrylonitrile-co-maleic anhydride) (PANCMA) and graphene grafted poly(acrylonitrile-co-maleimide) (G-PANCMI) membranes. The data obtained are as shown in FIG. 4(b). The CAw of the graphene grafted poly(acrylonitrile-co-maleimide) (G-PANCMI) membrane was reduced to zero within one second, whereas the poly(acrylonitrile-co-maleic anhydride) (PANCMA) membrane took about 420 seconds to reach <5°. The rapid reduction in contact angle of the graphene grafted poly(acrylonitrile-co-maleimide) (G-PANCMI) membrane further confirmed the ultra-wettability of the modified graphene.

Dispersibility Test

As the dispersibility of the graphene attached to the polymer is critical in fabricating water filtration membrane by phase inversion method, the dispersibility of graphene and graphene grafted poly(acrylonitrile-co-maleimide) (G-PANCMI) was evaluated.

For this, 1% solution of graphene grafted poly(acrylonitrile-co-maleimide) (G-PANCMI) in N—N-dimethyl acetamide (DMAc) was prepared in 50 ml glass bottle. The solution was ultrasonicated for 1 hr at 37 kHz. The ultrasonicated solution was allowed to settle at a constant position at room temperature with relative humidity of 65-70%. Images of the solution were taken at given time intervals, at 1 hour after ultrasonification and every subsequent 24 hrs, up to 120 hrs.

Solution containing graphene was prepared using the same method sets forth above. Images of the solution containing graphene were also taken at the same time intervals, at 1 hour after ultrasonification and every subsequent 24 hrs, up to 120 hrs.

Figures 4C, 4D:
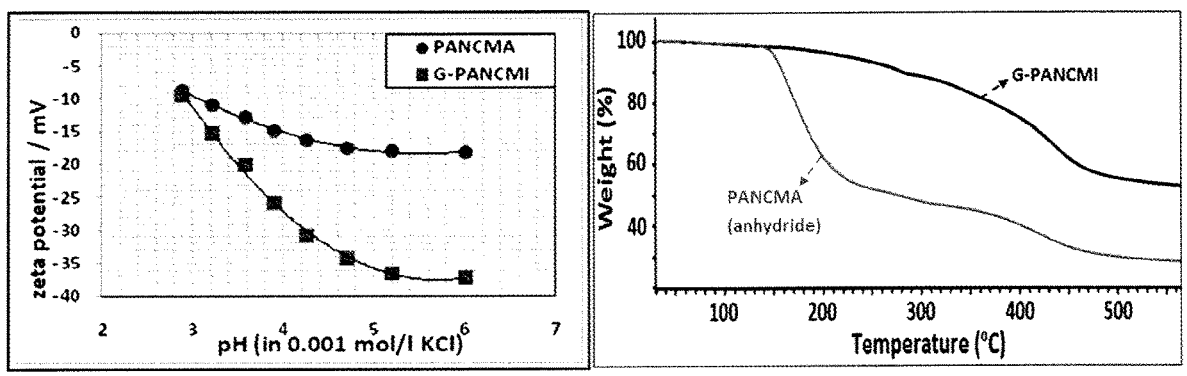

FIG. 4(c) shows the images that were captured. The images clearly show that the solution containing graphene completely settled down within few hours whereas the solution containing of graphene grafted poly(acrylonitrile-co-maleimide) (G-PANCMI) remained dispersed even after 120 hrs. This shows that the modified graphene in the solution containing graphene grafted poly(acrylonitrile-co-maleimide) is more stable than unmodified graphene. This behaviour of high dispersibility is due to the increase in polarity and charge density of the modified graphene which contains carboxyl, hydroxyl and amine functional groups.

Morphology Analysis

Figure 5A:
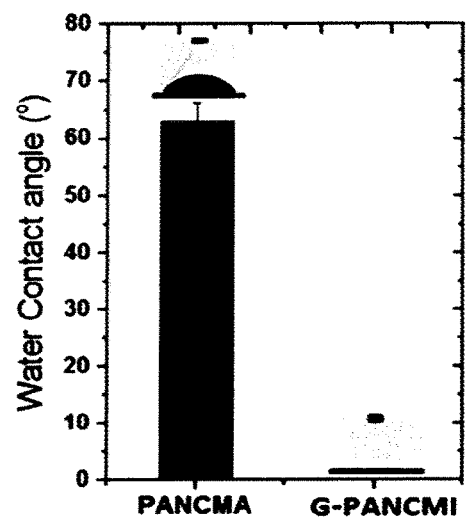
FIG. 5(a) is a graph showing the average water contact angle of poly(acrylonitrile-co-maleic anhydride) (PANCMA) and graphene grafted poly(acrylonitrile-co-maleimide) (G-PANCMI).
Figure 5B:
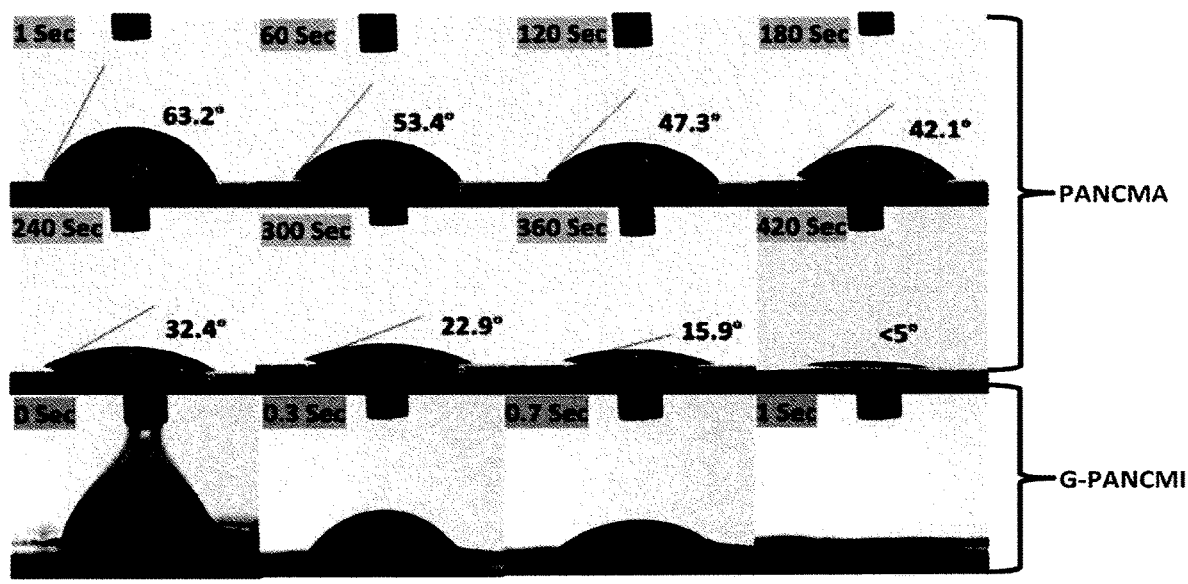
FIG. 5(b) shows the water contact angle reduction of poly(acrylonitrile-co-maleic anhydride) (PANCMA) and graphene grafted poly(acrylonitrile-co-maleimide) (G-PANCMI) membranes with time.
Figure 5C:
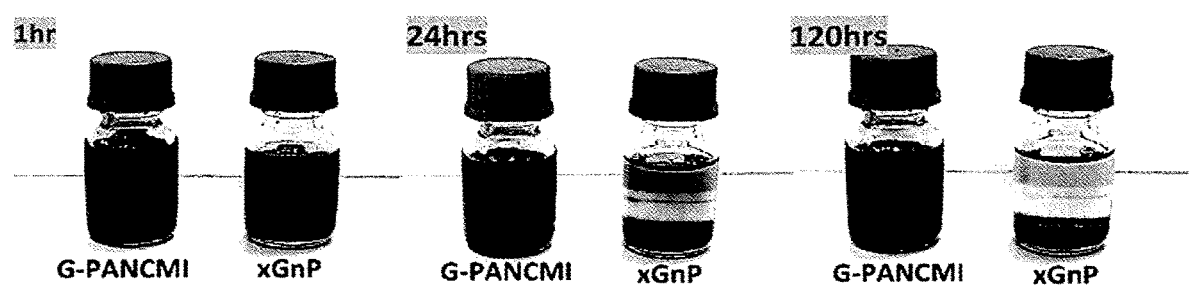
FIG. 5(c) shows the dispersibility or stability of the unmodified graphene and modified graphene grafted poly(acrylonitrile-co-maleimide) (G-PANCMI) in solution with time.

The surface morphology and cross-section of the poly(acrylonitrile-co-maleic anhydride) (PANCMA) and the ultra-wetting graphene grafted poly(acrylonitrile-co-maleimide) (G-PANCMI) membranes were examined using scanning electron microscopy (SEM). The pictures taken are shown in FIG. 5.

Both the poly(acrylonitrile-co-maleic anhydride) (PANCMA) and graphene grafted poly(acrylonitrile-co-maleimide) (G-PANCMI) membranes have an average thickness of 100 μm. However, the membranes exhibit different internal structures depending on their composition.

The poly(acrylonitrile-co-maleic anhydride) (PANCMA) membrane shows presence of a large number of macro voids in its internal structure; whereas the ultra-wetting graphene grafted poly(acrylonitrile-co-maleimide) (G-PANCMI) membrane has fewer macro voids and it has more sponge-like structures in the cross-section next to the internal surface.

The presence of highly hydrophilic amine, hydroxyl and carboxylic groups in the ultra-wetting graphene increases the viscosity and the coagulation value of the casting solution. This increase in coagulation value will slow down the non-solvent/solvent exchange. As a result, less water will be drawn into the membrane, thus reducing the macro voids in the ultra-wetting graphene grafted poly(acrylonitrile-co-maleimide) (G-PANCMI) membrane. A macro voids free sponge-like structure helps to enhance the porosity, water permeability and selectivity of the membrane. Moreover, even distribution of the ultra-wetting graphene nanosheets can be identified in the cross-section surface and on the outer surface of the graphene grafted poly(acrylonitrile-co-maleimide) (G-PANCMI) membrane. Also, the graphene grafted poly(acrylonitrile-co-maleimide) (G-PANCMI) membrane of an embodiment of the present invention is black, whereas the poly(acrylonitrile-co-maleic anhydride) (PANCMA) membrane remains white in colour.

Pore Size Analysis

The poly(acrylonitrile-co-maleic anhydride) (PANCMA) and graphene grafted poly(acrylonitrile-co-maleimide) (G-PANCMI) membranes show no significant difference in their mean pore size. The average pore size of poly(acrylonitrile-co-maleic anhydride) (PANCMA) membrane was 0.08±0.02 μm and the average pore size of the graphene grafted poly(acrylonitrile-co-maleimide) (G-PANCMI) membrane was 0.07±0.02 μm.

Clean Water Flux Test

Figure 6:
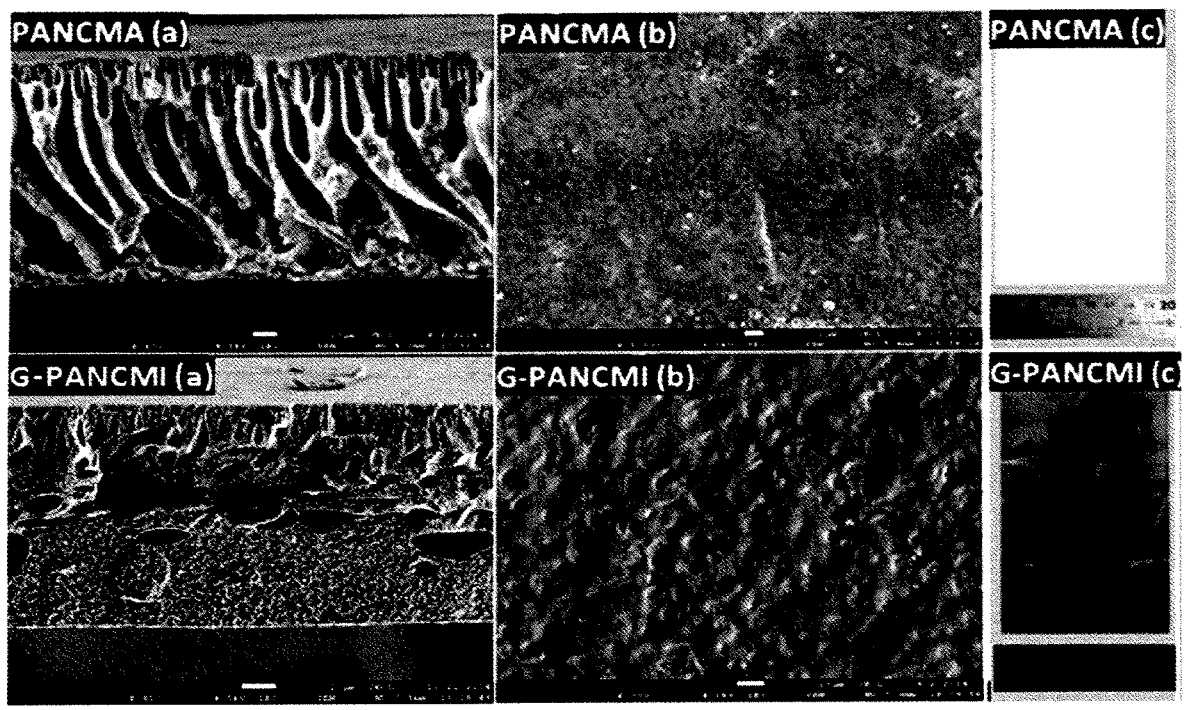
FIG. 6(a) shows the SEM images of the synthesized poly(acrylonitrile-co-maleic anhydride) (PANCMA) membrane and the graphene grafted poly(acrylonitrile-co-maleimide) (G-PANCMI) membrane.
FIG. 6(b) shows the cross-sectional views of the synthesized poly(acrylonitrile-co-maleic anhydride) (PANCMA) membrane and the graphene grafted poly(acrylonitrile-co-maleimide) (G-PANCMI) membrane.
FIG. 6(c) shows the outer surfaces, i.e. the actual images of the synthesized poly(acrylonitrile-co-maleic anhydride) (PANCMA) membrane and the graphene grafted poly(acrylonitrile-co-maleimide) (G-PANCMI) membrane.
Figure 7A:
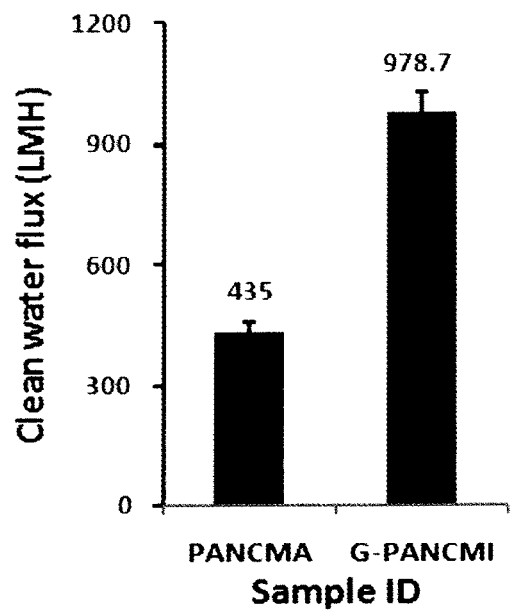
FIG. 7(a) shows the pure water flux at 1 bar (100 kPa) feed pressure.
Figure 7B:
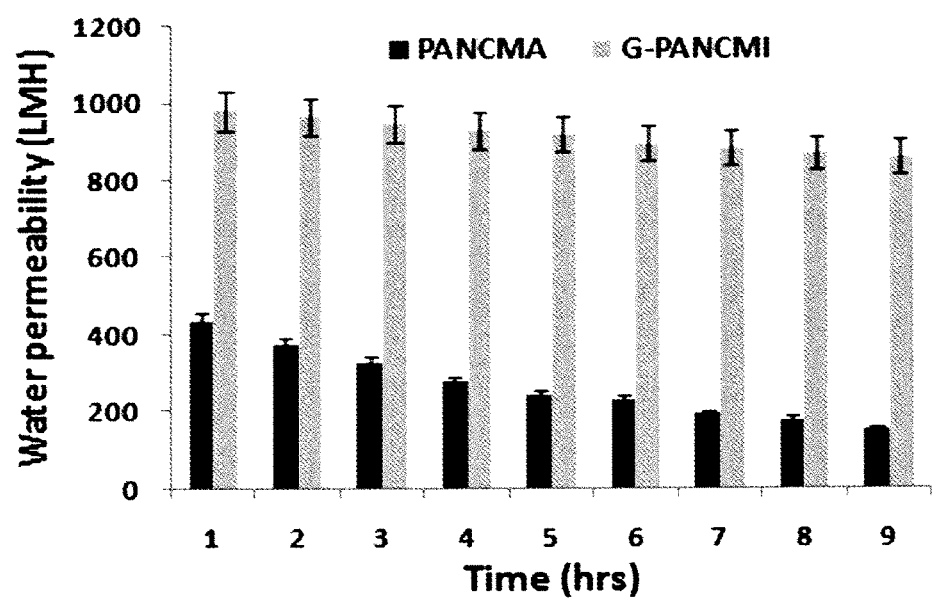
FIG. 7(b) shows the water permeability during long time run with 10 ppm Bovine Serum Albumin (BSA) solution at 1 bar (100 kPa) feed pressure.
Figure 7C:
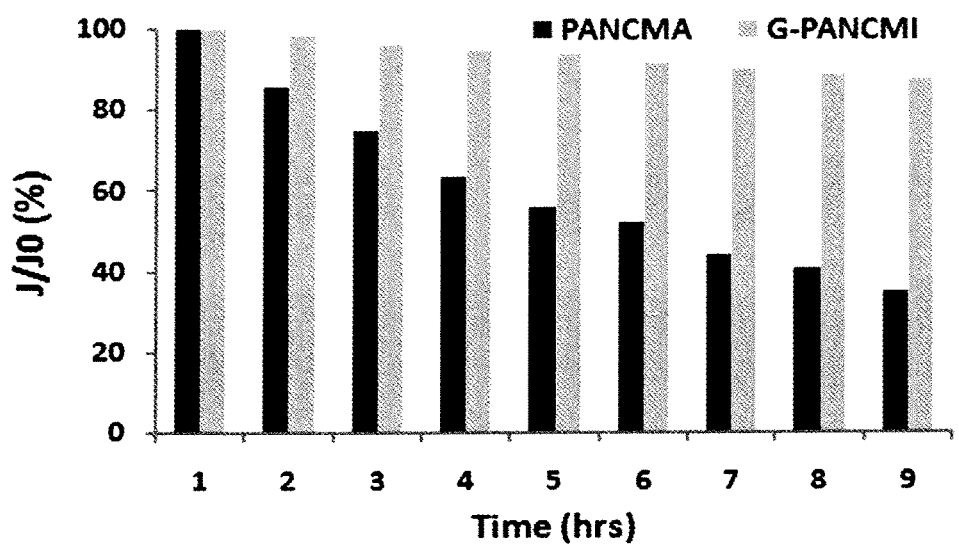
FIG. 7(c) shows the normalized water permeability for the BSA solution separation during long time run.
Figure 7D:
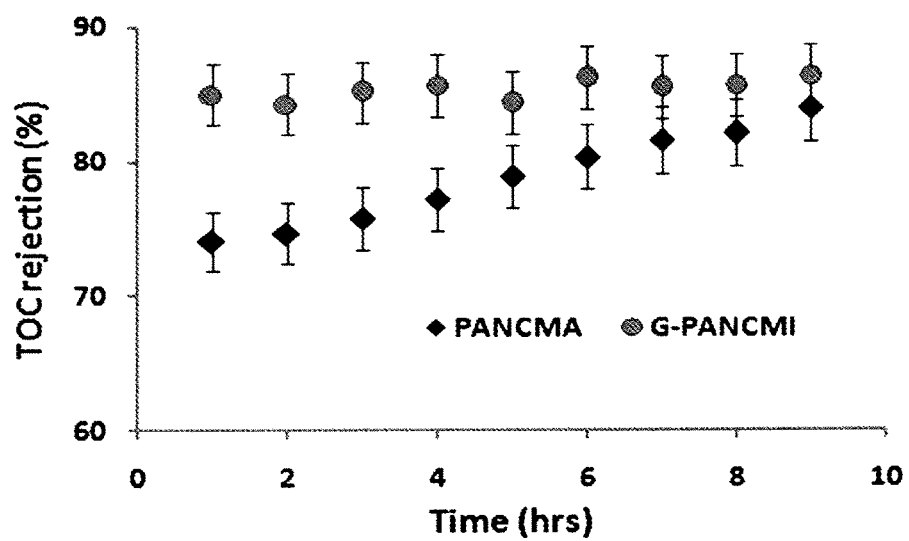
FIG. 7(d) shows the BSA protein (TOC) removal efficiency in percentage of the poly(acrylonitrile-co-maleic anhydride) (PANCMA) and the graphene grafted poly(acrylonitrile-co-maleimide) (G-PANCMI) membranes.

The prepared poly(acrylonitrile-co-maleic anhydride) (PANCMA) and graphene grafted poly(acrylonitrile-co-maleimide) (G-PANCMI) membranes were tested to evaluate the clean water flux using cross-flow filtration method. A constant feed water pressure of 100 kPa was employed. The data collected is shown in FIG. 6($a$). The results show that the poly(acrylonitrile-co-maleic anhydride) (PANCMA) membrane gave a pure water flux of 435±14 LMH.

Even though the pore size is similar for both membranes, the graphene grafted poly(acrylonitrile-co-maleimide) (G-PANCMI) membrane gave a higher pure water flux of 978±27 LMH. This is around 126% higher as compared to the poly(acrylonitrile-co-maleic anhydride) (PANCMA) membrane. This increase in pure water flux is due to the increase in hydrophilicity or wettability of the membrane by the carboxylic, hydroxyl and amine functional groups which are attached to the graphene nanosheets.

Long Time Performance and Fouling Evaluation

To evaluate the anti-fouling efficiency of the membrane, a 9 hrs filtration test was conducted using 10 ppm BAS in deionised water as a feed solution. The results are summarized in FIG. 6($b$).

It was observed that the graphene grafted poly(acrylonitrile-co-maleimide) (G-PANCMI) membrane gave a more stable flux as compared to the poly(acrylonitrile-co-maleic anhydride) (PANCMA) membrane. FIG. 6($c$) shows the normalized permeability or flux drop over time. The flux drop for the graphene grafted poly(acrylonitrile-co-maleimide) (G-PANCMI) membrane was only 12.3% of the initial flux after 9 hrs protein separation, whereas the poly(acrylonitrile-co-maleic anhydride) (PANCMA) membrane's flux drop is 64.3% for the same duration of operation. These results highlight that the presence of negatively charged —COOH and —$NH_2$ in the ultra-wetting graphene grafted poly(acrylonitrile-co-maleimide) (G-PANCMI) membrane can best repel proteins from the surface of the membrane.

In order to evaluate the selectivity and the filtration efficiency of the membrane, the Total Organic Carbon (TOC) of the feed BAS solution and permeate water were measured. Four samples were collected every 60 minutes with 15 minutes frequency and the TOC was measured in order to get the average TOC removal over time. Percentage of TOC rejection was calculated. The results obtained are as shown in FIG. 6($d$).

From the experimental results, it is found that the TOC removal of the graphene grafted poly(acrylonitrile-co-maleimide) (G-PANCMI) membrane is higher and more stable as compared to the poly(acrylonitrile-co-maleic anhydride) (PANCMA) membrane. These results also confirm that the graphene grafted poly(acrylonitrile-co-maleimide) (G-PANCMI) has better hydrophilicity or wettability by having negatively charged —$NH_2$ and —COOH on the membrane surface. Recent studies have shown that the negative surface charge of a membrane prevents the deposition of the negatively charged colloidal particles, such as proteins, lipids and amino acids, etc., on the membrane surface by electrostatic repulsion. This could slow down or reduce membrane fouling. A similar effect is also apparent in the present work, as depicted in the illustration shown in FIG. 7. The electrostatic repulsion between the membrane surface and the natural organic maters (NOMs) and hydrogen bonding between $H_2O$, and —NH2 and —COOH of the graphene grafted poly(acrylonitrile-co-maleimide) (G-PANCMI) membrane are highlighted in FIG. 3.

On a related note, it is interesting to see from FIG. 6 that the increase in TOC removal efficiency of the control poly(acrylonitrile-co-maleic poly(acrylonitrile-co-maleic anhydride) (PANCMA) membrane with time may be due to pore constriction/blocking or development of fouling on the membrane surface.

Finally, a confocal lacer scanning microscopy (CLSM) analysis was conducted on the membrane samples to evaluate the protein absorption on the membrane surface. The images captured are shown in FIG. 7($b$). From the images, it can be further confirmed that the protein absorption on the graphene grafted poly(acrylonitrile-co-maleimide) (G-PANCMI) membrane surface can be negligible and conversely, the protein absorption on the poly(acrylonitrile-co-maleic poly(acrylonitrile-co-maleic anhydride) (PANCMA) membrane can be high.

Example 5

Preparation of Hollow-Fiber Membrane by Dry-Wet Spinning Method

Modified polyethersulfone graphene grafted poly(acrylonitrile-co-maleimide) (PES-G-PANCMI) hollow-fiber membrane was prepared using dry-wet spinning method. In this example, polyethersulfone (PES) was used as the base polymer, N-methyl-2-pyrrolidone (NMP) was used as a base solvent, diethylene glycol (DEG) was used as a non-solvent, polyvinylpyrrolidone (PVP-k-30) was used as an additive (pore forming agent) and graphene grafted poly(acrylonitrile-co-maleimide) (G-PANCMI) was used as a hydrophilic additive. The composition of the casting solution consists of 21 wt % PES, 5 wt % PVP-K-30, 5 wt % DEG and 69 wt % NMP. 5 wt % of graphene grafted poly(acrylonitrile-co-maleimide) (G-PANCMI) was added to the dope composition to replace 5% of NMP where the NMP concentration was 64%. The phase diagram of the casting solution (or dope composition) is shown in FIG. 2.

The casting solution was prepared by adding PVP into a NMP/DEG mixture in a round bottom flask. The solution was stirred by a mechanical stirrer for at least 1.0 to 1.5 hours. After the PVP was completely dissolved in the solution, polyethersulfone (PES) and graphene grafted poly (acrylonitrile-co-maleimide) (G-PANCMI) were added. The mixture was allowed to stir at a constant speed of 250 to 350 rpm for at least 24 hrs at 80° C., to obtain a completely dissolved/dispersed homogeneous polymeric solution. The dope solution was poured into a polymer tank and degassed at a negative pressure of −0.6 bar for about 15 to 20 minutes. Nitrogen gas was purged into the dope tank to create an inert atmosphere and to push the polymer towards the polymer pump. N-methyl-2-pyrrolidone (NMP) and water were mixed at a ratio of 80:20 and the solution was used as a bore liquid. The bore liquid was poured into a bore liquid tank. The polymer solution and the bore liquid were then pumped to a spinneret (OD 1.2 mm, ID 0.6 mm). The air gap was fixed at 50 mm. Hollow-fiber membrane was fabricated at around 25° C. and at around 65% to 70% relative humidity with a take up speed of 0.21 m/s. The membrane was then collected from the winder and left inside the water tank (post-coagulation tank) for 24 hrs to wash out the residual NMP, DEG and PVP that was not removed from the membrane at the point of the fabrication process. The membrane was then immersed into a post-treatment solution of 40% water and 60% glycerin before it was tested for clean water flux.

A control polyethersulfone (PES) membrane was also prepared using the same method sets forth above.

Example 6

Oily Wastewater Treatment

In order to evaluate the effect of the novel ultra-wetting graphene grafted poly(acrylonitrile-co-maleimide) (G-PANCMI) on the wettability/hydrophilicity of other commercially well-known materials, a 5 wt % graphene grafted poly(acrylonitrile-co-maleimide) (G-PANCMI) was blended with polyethersulfone (PES) dope solution as a hydrophilic additive to produce an ultrafiltration membrane for oily wastewater treatment. The results obtained were compared with a membrane obtained without graphene grafted poly(acrylonitrile-co-maleimide) (G-PANCMI).

The prepared membranes were characterized for their morphology, water and oil contact angle, liquid entry pressure of oil, water permeability or pure water flux and finally, the prepared membranes were subjected to a continuous 8 hrs filtration test of oily wastewater. The experimental data obtained indicates that graphene grafted poly(acrylonitrile-co-maleimide) (G-PANCMI) plays an important role in the wettability of the modified polyethersulfone graphene grafted poly(acrylonitrile-co-maleimide) (PES-G-PANCMI) membrane. The water contact angle of the polyethersulfone (PES) membrane is reduced by 64.5%, from 63.7±3.8° to 22.6±2.5°, by adding 5 wt % graphene grafted poly(acrylonitrile-co-maleimide) (G-PANCMI). The addition of 5 wt % graphene grafted poly(acrylonitrile-co-maleimide) (G-PANCMI) also helps to increase the oil contact angle of the polyethersulfone (PES) membrane from 43.6±3.5° to 112.5±3.2°. This is 158% higher than that of the polyethersulfone (PES) membrane sample. More importantly, the liquid entry pressure (LEPoil) increased from 50±10 kPa of polyethersulfone (PES) membrane to 175±25 kPa of the modified polyethersulfone graphene grafted poly(acrylonitrile-co-maleimide) (PES-G-PANCMI) membrane. This is about 350% increase. Moreover, the addition of 5 wt % graphene grafted poly(acrylonitrile-co-maleimide) (G-PANCMI) to the polyethersulfone increased the water permeability by 43% without any change in the selectivity. The same trend was observed during a long term experiment with oily wastewater filtration.

Based on the above findings, it can be concluded that the ultra-wetting graphene-based membrane of some embodiments of the present invention will be an ideal new generation material for use as water filtration membranes and for other applications.

Morphology Analysis

The surface morphology and cross-sectional view of the polyethersulfone (PES) membrane and the modified polyethersulfone graphene grafted poly(acrylonitrile-co-maleimide) (PES-G-PANCMI) hollow-fiber membrane were examined using SEM. The results obtained are as shown in FIG. 8.

Figure 8A:
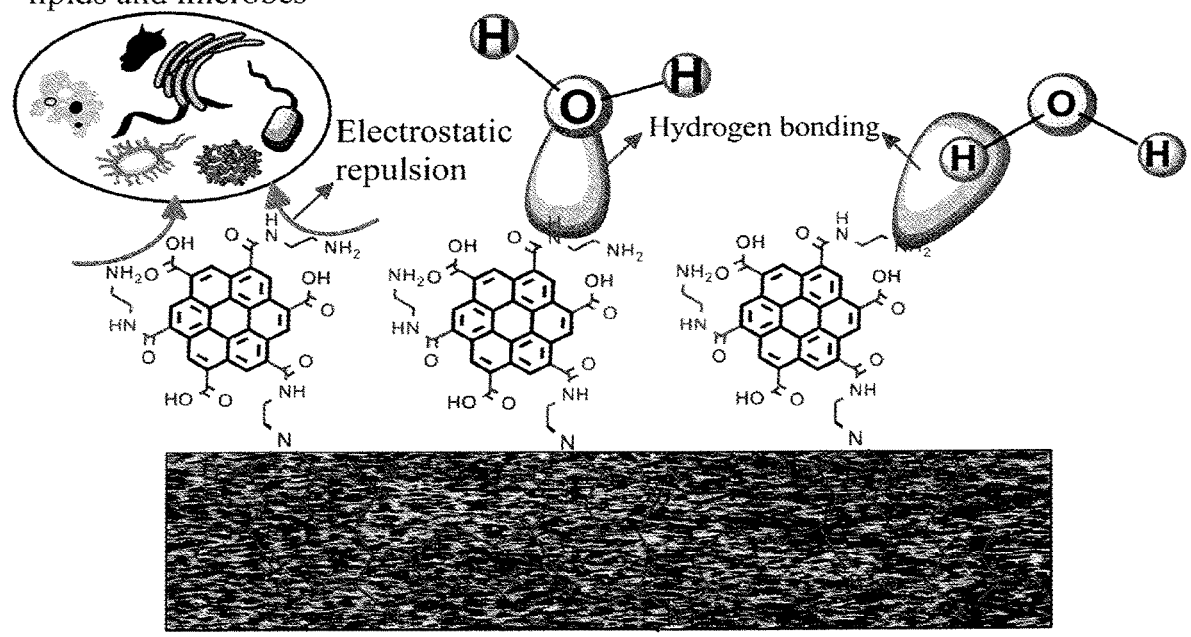
FIG. 8(a) is a schematic representation of hydrogen bonding and protein repulsion of the novel graphene-based membrane in accordance with some embodiments of the present invention.
Figure 8B:
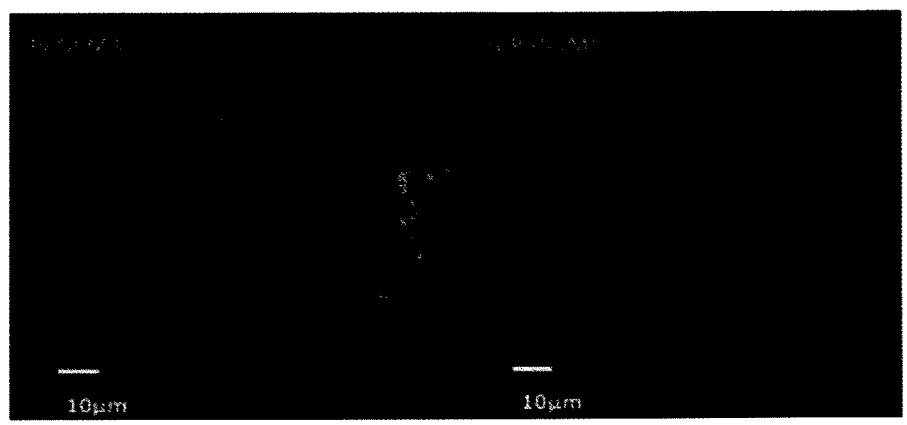
FIG. 8(b) is a confocal lacer analysis of the poly(acrylonitrile-co-maleic anhydride) (PANCMA) membrane and graphene grafted poly(acrylonitrile-co-maleimide) (G-PANCMI) membrane after protein filtration.

FIG. 8(a) shows the cross-sectional view of the polyethersulfone (PES) membrane as well as the modified polyethersulfone graphene grafted poly(acrylonitrile-co-maleimide) (PES-G-PANCMI) membrane. FIG. 8(b) shows the outer surfaces of the two membranes, and FIG. 8(c) shows the actual image of the prepared polyethersulfone (PES) membrane and the modified polyethersulfone graphene grafted poly(acrylonitrile-co-maleimide) (PES-G-PANCMI) hollow-fiber membrane. Both membranes have an average inner diameter of 0.6 mm and an outer diameter of 1.2 mm. However, these hollow-fiber membranes exhibit different internal structures depending on their composition. The polyethersulfone (PES) membrane shows presence of a large number of macro voids in its internal structure, whereas the ultra-wetting modified polyethersulfone graphene grafted poly(acrylonitrile-co-maleimide) (PES-G-PANCMI) hollow-fiber membrane has a lower macro voids, with more sponge-like structures in the cross-sectional surface, next to the internal surface. This may be due to the increase in viscosity and the coagulation value of the casting solution which contains the highly hydrophilic amine and carboxylic groups in the ultra-wetting graphene. This helps to slow down the non-solvent/solvent exchange. As a result, less water is drawn into the membrane which leads to the sponge-like structure. Sponge-like structure helps to enhance the water permeability and selectivity of the membrane. In addition, the even distribution of the ultra-wetting graphene nanosheets can be identified in the cross-sectional view and on the outer surface of the modified polyethersulfone graphene grafted poly(acrylonitrile-co-maleimide) (PES-G-PANCMI) membrane.

Pore Size Analysis

The average pore sizes of the polyethersulfone (PES) membrane and the ultra-wetting modified polyethersulfone graphene grafted poly(acrylonitrile-co-maleimide) (PES-GPANCMI) membrane were measured. The experimental data obtained indicates that there is no significant difference in the mean pore size of the two membranes. The average pore size of the polyethersulfone (PES) membrane is 0.07±0.02 μm, while the average pore size of the modified polyethersulfone graphene grafted poly(acrylonitrile-co-maleimide) membrane is 0.07±0.03 μm.

Water and Oil Contact Angles Analysis

Figures 9A, 9B:
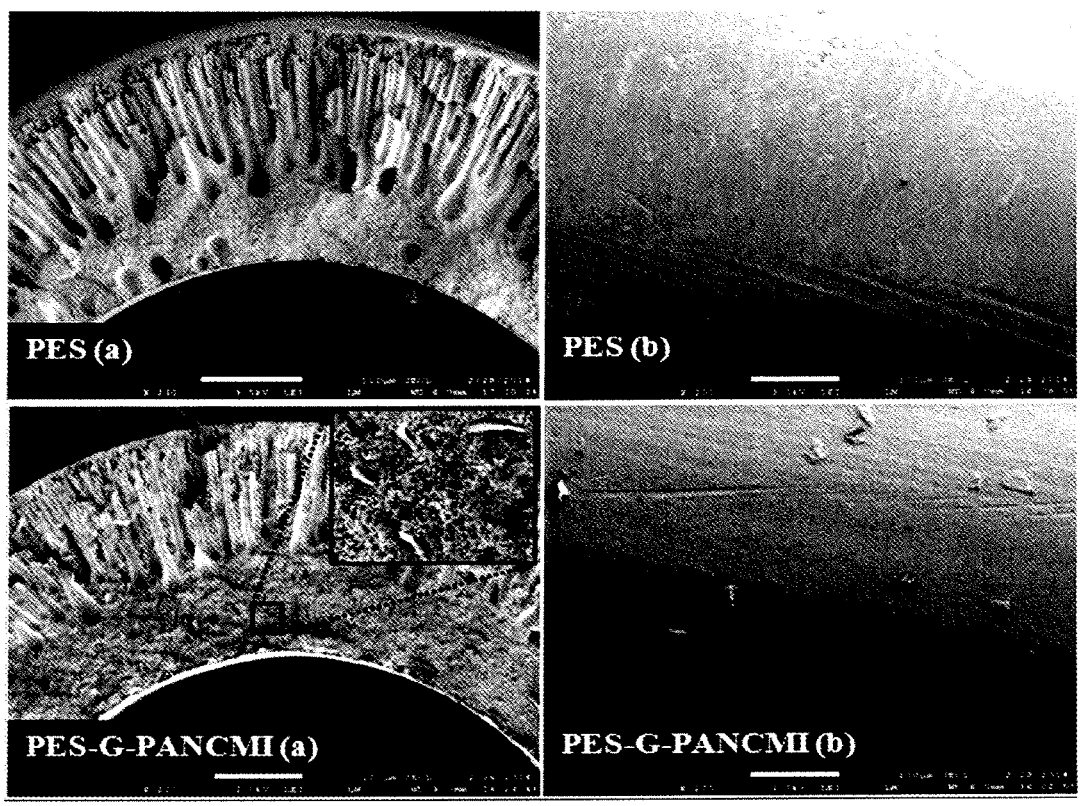
FIG. 9(a) shows the SEM images of the synthesized polyethersulfone (PES) membrane and the modified polyethersulfone graphene grafted poly(acrylonitrile-co-maleimide) (PES-G-PANCMI) membrane.
FIG. 9(b) shows the cross-sectional views of the synthesized polyethersulfone (PES) membrane and the modified polyethersulfone graphene grafted poly(acrylonitrile-co-maleimide) (PES-G-PANCMI) membrane.

FIG. 9 shows the average LEPoil, water and oil contact angles and clean water flux of both the membranes, together with its error range. The experimental data obtained indicates that the graphene grafted poly(acrylonitrile-co-maleimide) (G-PANCMI) plays an important role in the wettability of the modified polyethersulfone graphene grafted poly(acrylonitrile-co-maleimide) (PES-G-PANCMI) membrane. The water contact angle of the polyethersulfone (PES) membrane is reduced by 64.5%, from 63.7±3.8° to 22.6±2.5°, by the addition of 5 wt % graphene grafted poly(acrylonitrile-co-maleimide) (G-PANCMI). The addition of 5 wt % graphene grafted poly(acrylonitrile-co-maleimide) (G-PANCMI) to the polyethersulfone (PES) membrane helps to increase the oil contact angle of the polyethersulfone (PES) membrane from 43.6±3.5° to 112.5±3.2°. This is about 158% higher compared to that of the polyethersulfone (PES) membrane sample. More importantly, the liquid entry pressure (LEPoil) increases from 50±10 kPa of polyethersulfone (PES) membrane to 175±25 kPa of modified polyethersulfone graphene grafted poly(acrylonitrile-co-maleimide) (PES-G-PANCMI) membrane. This is about 350% increase. Moreover, the addition of 5 wt % graphene grafted poly(acrylonitrile-co-maleimide) (G-PANCMI) to polyethersulfone (PES) increases the water permeability by 43% without any change in the selectivity. The same trend was also observed during a long term experiment with oily wastewater filtration.

Based on the above findings, it can be concluded that the ultra-wetting graphene-based membrane in accordance with some embodiments of the present invention will be an ideal new generation material for use as water filtration membranes and in other applications.

Clean Water Flux Analysis

Figure 9C:
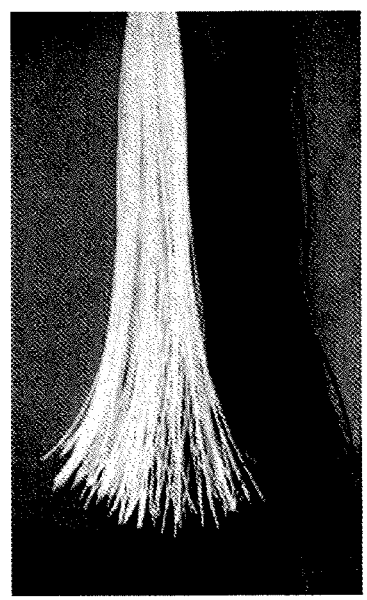
FIG. 9(c) shows the outer surfaces, i.e. the actual images of the synthesized polyethersulfone (PES) membrane and the modified polyethersulfone graphene grafted poly(acrylonitrile-co-maleimide) (PES-G-PANCMI) membrane.

The prepared polyethersulfone (PES) membrane and the ultra-wetting graphene modified polyethersulfone grafted poly(acrylonitrile-co-maleimide) (PES-G-PANCMI) membrane were tested to evaluate the clean water flux of the membranes using cross-flow filtration method. FIG. 9(c) shows the clean water flux of the two membranes, which was carried out at a constant feed water pressure of 100 kPa (1 bar). The polyethersulfone (PES) membrane gave a pure water flux of 437±18 LMH. Even though the pore sizes of both the membranes are similar, the ultra-wetting modified polyethersulfone graphene grafted poly(acrylonitrile-co-maleimide) (PES-G-PANCMI) membrane gave a higher pure water flux of 767±23 LMH. This is around 43% higher compared to the polyethersulfone (PES) membrane. This increase in pure water flux is due to the increase in hydrophilicity/wettability of the membrane by the carboxylic, hydroxyl and amine functional groups which are attached to the graphene nanosheets.

Figure 10:
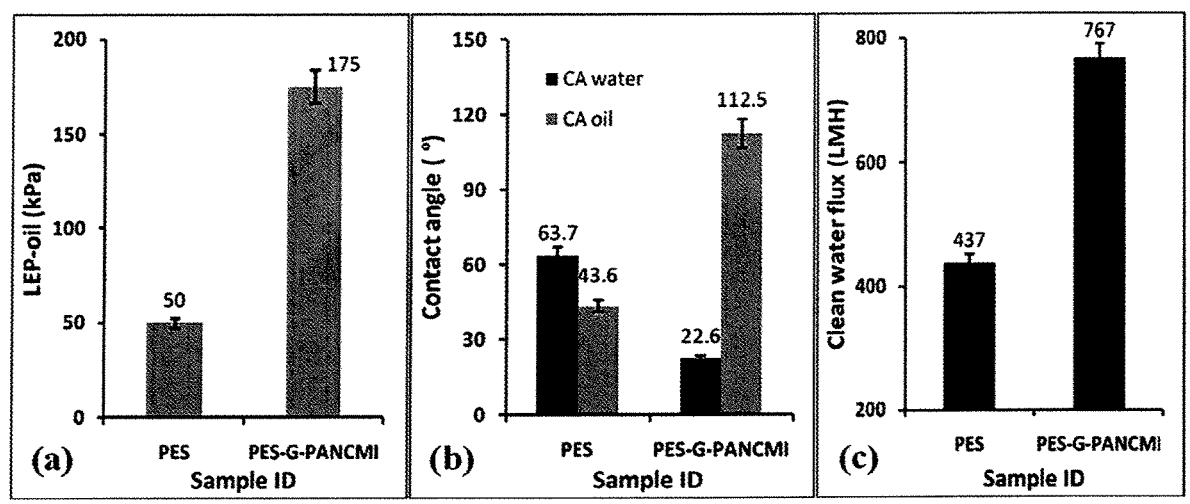
FIG. 10(a) is a chart showing the liquid entry pressure of oil ($LEP_{oil}$).
FIG. 10(b) is a chart showing the water and oil contact angle.
FIG. 10(c) is a chart showing the clean water flux of the polyethersulfone (PES) membrane and the modified polyethersulfone graphene grafted poly(acrylonitrile-co-maleimide) (PES-G-PANCMI) membrane.
Figure 11:
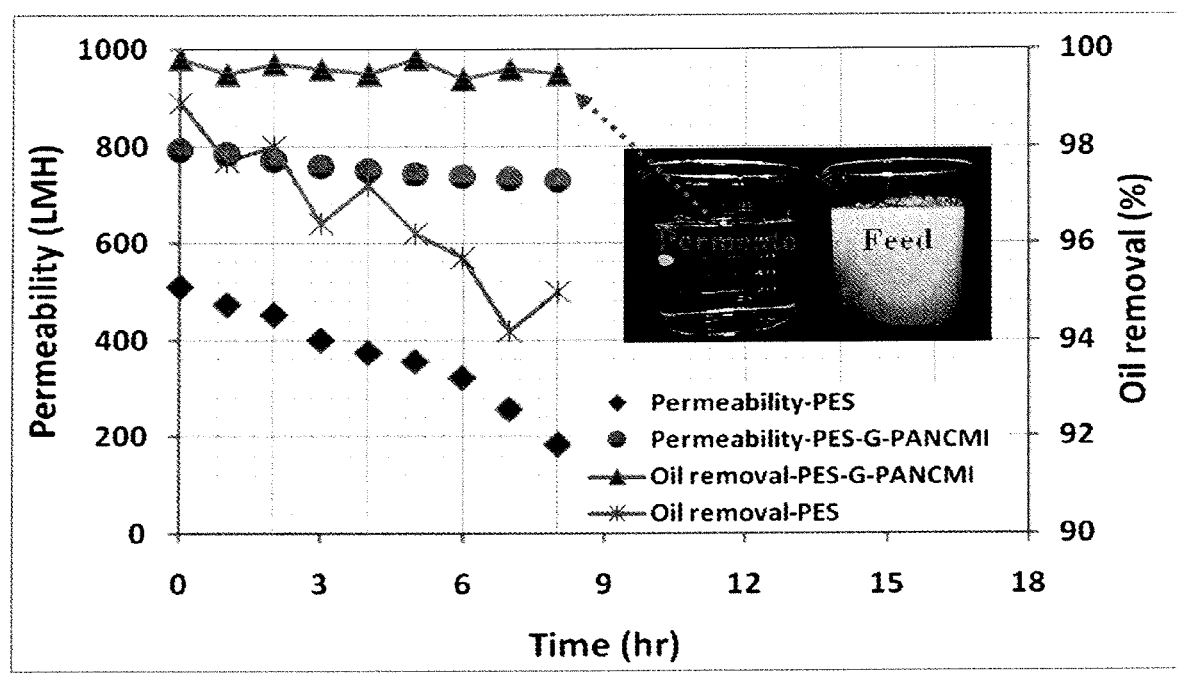
FIG. 11 shows the permeability (flux drop) and oil removal efficiency of the poly(acrylonitrile-co-maleic anhydride) (PANCMA) membrane and the graphene grafted poly(acrylonitrile-co-maleimide) (G-PANCMI) membrane in a long time study of 8 hours.

To evaluate the performance of the prepared membranes in oil water separation, a long period (8 hrs) filtration of 200 ppm oil (oil emulsion) in deionised water was carried out for the polyethersulfone (PES) membrane and the modified polyethersulfone graphene grafted poly(acrylonitrile-co-maleimide) (PES-G-PANCMI) membrane respectively. The results are summarized in FIG. 10.

It is observed that the ultra-wetting modified polyethersulfone graphene grafted poly(acrylonitrile-co-maleimide) (PES-G-PANCMI) membrane gave a more stable flux compared to the polyethersulfone (PES) membrane.

The above is a description of the subject matter the inventors regard as various embodiments of the invention and is believed that those skilled in the art can and will design alternative embodiments that include of this invention as set forth in the following claims.

The invention claimed is:

1. A method of producing a single-layer graphene-based membrane from a graphene-polymer composite, the method comprising:
   (i) reacting a polymer containing an anhydride group with an amine functionalized graphene in presence of a solvent to form an intermediate product; and
   (ii) thermal imidizing the intermediate product to form a graphene grafted polymer composite for use in fabricating graphene-based membrane,
   wherein the polymer containing the anhydride group is a poly(acrylonitrile-co-maleic anhydride) and wherein the graphene grafted polymer is a graphene grafted poly(acrylonitrile-co-malemide).

2. The method according to claim 1, wherein the thermal imidization is carried out by heating the intermediate product at a temperature ranging from 115° C. to 255° C. for a period of 1.5 to 4.5 hours.

3. The method according to claim 1, wherein the thermal imidization is carried out by heating the intermediate product at 195° C. to 125° C. for 0.5 to 1.5 hours, followed by 180° C. to 220° C. for another 0.5 to 1.5 hours, and 245° C. to 255° C. for yet another 0.5 to 1.5 hours.

4. The method according to claim 1, wherein the thermal imidization is carried out by heating the intermediate product at 120° C. for 2 hours, followed by 200° C. for 1 hour.

5. The method according to claim 1, wherein the solvent is a polar aprotic solvent.

6. The method according to claim 5 wherein the solvent is N—N-dimethyl acetamide.

7. The method according to claim 1, wherein the polymer containing an anhydride group reacts with the amine functionalized graphene at a temperature of 80° C. for 24 hours.

8. The method according to claim 1, wherein the intermediate product is graphene grafted poly(acrylonitrile-co-maleic acid).

9. The method according to claim 1, further comprising:
   adding the graphene grafted polymer composite to a solution containing polyvinylpyrolidone, N-methyl-2-pyrolidone and diethylene glycol; and
   stirring the solution to obtain a homogenous polymeric casting solution for use in fabricating graphene-based membrane.

10. The method according to claim 9, wherein the casting solution comprises 15 to 40 wt % graphene grafted polymer composite, 2 to 15 wt % polyvinylpyrolidone, 1 to 15 wt % diethylene glycol and 40 to 80 wt % N-methyl-2-pyrolidone.

11. The method according to claim 9, wherein the casting solution comprises 21 wt % graphene grafted polymer composite, 5 wt % polyvinylpyrolidone, 5 wt % diethylene glycol and 69 wt % N-methyl-2-pyrolidone.

12. The method according to claim 9, wherein the solution is stirred at a speed of 250 to 350 rpm for at least 24 hours at 80° C.

13. The method according to claim 9, further comprising:
fabricating the graphene-based membrane using phase inversion method.

14. The method according to claim 13, wherein the graphene-based membrane is a flat sheet membrane.

15. The method according to claim 1, further comprising:
adding a second polymer selected from the group consisting of polyethersulfone, polyvinylidene fluoride, polyacrylonitrile, cellulose acetate, polytetrafluoroethylene and polypropylene to the graphene grafted poly(acrylonitrile-co-maleimide) composite to form a mixture;
adding the mixture to a solution comprising polyvinylpyrolidone, N-methyl-2-pyrolidone and diethylene glycol; and
stirring the solution to obtain a homogenous polymeric casting solution for use in fabricating graphene-based membrane.

16. The method according to claim 15, wherein the second polymer is polyethersulfone.

17. The method according to claim 16, wherein the casting solution containing the modified polyethersulfone graphene grafted poly(acrylonitrile-co-maleimide) composite comprises 15 to 40 wt % polyethersulfone, 2 to 15 wt % polyvinylpyrolidone, 1 to 15 wt % diethylene glycol, 40 to 80 wt % N-methyl-2-pyrolidone and 1 to 25 wt % graphene grafted poly(acrylonitrile-co-maleimide) composite.

18. The method according to claim 16, wherein the casting solution containing the modified polyethersulfone graphene grafted poly(acrylonitrile-co-maleimide) composite comprises 21 wt % polyethersulfone, 5 wt % polyvinylpyrolidone, 5 wt % diethylene glycol, 64 wt % N-methyl-2-pyrolidone and 5 wt % graphene grafted poly(acrylonitrile-co-maleimide) composite.

19. The method according to claim 15, wherein the solution is stirred at a speed of 250 to 350 rpm for at least 24 hours at 80° C.

20. The method according to claim 15, further comprising:
fabricating the graphene-based membrane using dry-wet spinning method.

21. The method according to claim 20, wherein the graphene-based membrane is a hollow-fiber membrane.

22. The method according to claim 14, wherein the graphene-based membrane has an average pore size of 0.04 to 0.10 µm.

* * * * *